United States Patent Office 2,698,855
Patented Jan. 4, 1955

2,698,855

19-NOR-DELTA-4-ANDROSTENE, 3-ONE, 17-BETA BENZOATE AND METHOD FOR MANUFACTURING SAME

Lawrence Hicks, Chicago, Ill., assignor to Organics, Inc., Chicago, Ill., a corporation of Illinois No Drawing. Application March 4, 1954,
Serial No. 414,218

2 Claims. (Cl. 260—397.4)

This invention relates to the manufacture of 19-nor-delta-4-androstene, 3-one, 17-beta benzoate (19-nor testosterone benzoate) and it is an object of this invention to produce and to provide a method for producing 19-nor-delta-4-androstene, 3-one, 17-beta benzoate.

In my copending application Ser. No. 353,007, filed May 4, 1953, description is made of the manufacture of 19-Nor-delta-4-androstene, 3-one, 17-beta esters such as the propionate, cyclopentyl propionate, acetate, benzoate and the like and to methods for preparing same where the corresponding 17 ol is reacted for esterification with the corresponding acid anhydride or alkyl halide.

The androstene compounds and their derivatives generally exhibit two types of biological activity—namely, androgenic or male sex hormone activity and myotrophic or protein anabolic activity. In the use for treatment of conditions wherein myothrophic or protein anabolic activity is important, conjoint androgenic activity may not only be undesirable but more often is harmful to the extent that its presence will prohibit use of the particular steroid compound. This is particularly true in pediatrics and in geriatrics.

Many attempts have been made to isolate the desirable mytrophic or protein anabolic activity from the androgenic activity but elimination of the androgenic activity of androstane and androstene compounds generally results also in the lowering or loss also of the protein anabolic activity. The separation of the two types of activity becomes difficult, especially in androstene steroidal compounds of the type described, yet it has been found that the build-up of the steroid molecule with certain groupings as distinguished from others enables such separation in a few instances in the production of a compound which has a high level of a desirable myotrophic activity without objectionable amounts of androgenic activity. A general pattern with respect to the types of groups or their location on the steroid molecule for the development of such results has not, to the present, been established. In the esters of 19-Nor-delta-4-androstene, 3-one, 17-beta ol, it has been found that the aliphatic esters such as the propionate, acetate, cyclopentyl propionate, valerate and the like have a high ratio of the undesirable androgenic activity with respect to the desirable myotrophic or protein anabolic activity. It has been found, however, that the 19-Nor-delta-4-androstene, 3-one, 17-beta benzoate appears unexpectedly to be entirely unrelated to the aliphatic esters in that, unlike the aliphatic esters, the benzoate has a negligible amount of androgenic activity, yet its protein anabolic activity remains high enough so that an unexpectedly high ratio of anabolic activity to androgenic activity is secured.

Aside from these important differences in undesirable androgenic activity of which the benzoate is relatively free, the benzoate ester differs from the aliphatic esters also in the limitations with respect to the methods of manufacture and in the properties of the final compound. Where the aliphatic esters can be formed by reaction of the 17 ol with the coresponding acid anhydride or alkyl halide, the benzoic acid ester cannot be prepared in commercially economical yields by reaction of the 17 ol with the alkyl halide. It seems that the reaction product that is formed comprises a mixture of the corresponding 17 benzoate with the enol dibenzoate from which separation of the 17 benzoate is difficult. With benzoic anhydride as the reactant for esterification, excellent yields of relatively pure benzoate can be secured which requires little, if any, purification as will become apparent from the following procedure for the preparation of 19-Nor-delta-4-androstene, 3-one, 17-beta benzoate.

The benzoate appears also to differ from the corresponding aliphatic esters such as the acetate, propionate, cyclopentyl propionate and the valerate in the characteristics of the end product which is formed. The aliphatic esters all appear to form as a hydrate containing 1–1.5 moles of water of crystallization. The presence of this water of crystallization appears to make crystallization of the aliphatic esters difficult and they are therefore inclined to exist as amorphous, resinous substances. On the other hand, the benzoate is free of water of crystallization and forms readily into long needle-like crystals having a melting point of 174–175° C. and a specific rotation at 20° in sodium light in 95 percent ethanol of $+104.5°$.

EXAMPLE 1

*Preparation of 19-Nor-delta-4-androstene, 3-one, 17-beta-ol*

Three grams of estradiol-17-beta (0.011 mole; M. W. 272.4) was dissolved in 500 ml. of 2.5 N sodium hydroxide solution preferably with warming. To this mixture was added, dropwise at 0.5 degree C., 18.8 ml. (0.2 mole, 25.2 gm., M. W. 126) of dimethylsulfate with good agitation. After all of the dimethylsulfate was added, the mixture was allowed to warm to room temperature with stirring (2–3 hours) and then heated on a water bath (80–90 degrees C.) for one hour. The warm mixture was then diluted with two volumes of water and then cooled with scratching whereby crude methyl ether separated. This is washed well first with water and then by 70 percent methanol. Upon recrystallization from dilute ethanol, it melted at 120–121 degrees C.

17-beta estradiol-3-methyl ether (0.50 g., 0.0017 mole, M. P. 120–121 degrees) was added to the reaction flask, followed by 40 ml. of anhydrous ether. When complete solution of the solid had occurred, 50 ml. of anhydrous liquid ammonia was added with stirring, and 0.50 g. (0.072 mole) of lithium wire was immediately added in small pieces to the homogeneous solution, over a one-minute interval. The blue reaction mixture was stirred an additional ten minutes, then 4.6 g. (0.10 mole) of absolute ethanol was added dropwise over a ten to twenty minute interval with stirring when the foaming subsided. When the blue color had disappeared, most of the ammonia was evaporated by carefully heating on the steam bath, then 100 ml. of cold water was added carefully to decompose the mixture. The aqueous layer was separated and extracted with four 15 ml. portions of ether. The combined solvent layers were washed with two 10 ml. portions of water, one 10 ml. portion of saturated sodium chloride solution, and were then dried over anhydrous potassium carbonate. The drying agent was removed by filtration and the residue obtained after distillation of the solvent was crystallized from thiophene-free benzene to yield 1.4-dihydroestradiol-17-beta-3-methyl ether. M. P. 111–113.5.

To a solution of 220 mg. of the dihydro compound (M. P. 111.5–115.5 degrees) in 15 ml. of boiling methanol, was added over a three-minute period with swirling, a hot solution of 2.5 ml. of concentrated hydrochloric acid and 7.5 ml. of water. The mixture was then allowed to cool slowly in a beaker of hot water over a period of one hour. After heating for a short time, the product was extracted with several portions of ether, the combined extract washed with water, saturated sodium bicarbonate, water and dried over sodium sulfate. Removal of the solvent, recrystallization from methylcyclohexane containing a small amount of ethyl acetate, and drying at 70 degrees (0.05 mm.) for two hours gave 19-nor-delta-4-androstene, 3-one, 17-beta-ol. M. P. 109.5–110.5 degrees.

EXAMPLE 2

*Preparation of 19-Nor-delta-4-androstene, 3-one, 17-beta benzoate*

27.4 grams (0.1 mole) of 19-Nor-delta-4-androstene, 3-one, 17-beta-ol of Example 1 is dissolved in 500 cc. of anhydrous pyridine and 28.25 grams (0.125 mole) of benzoic anhydride added. The solution is refluxed for about four hours.

50 cc. of distilled water is then added and refluxing is continued for an additional four hours to decompose or hydrolyze excess acid anhydride to benzoic acid. This step has been found to be important, otherwise the product will contain excess anhydride which is difficult to eliminate. On the other hand, if the material is hydrolyzed to benzoic acid, the latter is easily separated from the desired product.

The pyridine-water solution containing the steroid ester and free benzoic acid is distilled to a dry residue, and then taken up by solution in benzene. The benzene solution is washed exhaustively with saturated sodium bicarbonate to free it of benzoic acid and it is then washed with 1 N hydrochloric acid to free it of traces of pyridine.

The benzene solution is then exhaustively washed with water to free it of mineral acid and it is then distilled to dryness. The dry residue is dissolved in anhydrous ethanol by boiling under reflux and then sufficient water is added to the alcohol solution to reduce the concentration of the alcohol to 75 percent by volume. Upon cooling, the benzoate crystallizes in long needles. No recrystallization is believed to be necessary since the resulting product indicates substantial purity since the crystals have a melting point of 174–175° C. and a specific rotation of 20° C. at 104.5°.

The yield of the 19-Nor-delta-4-androstene, 3-one, 17-beta benzoate ranges as high as 97 percent of theory.

It has been found that the compound 19-Nor-delta-4-androstene, 3-one, 17-beta, benzoate differs materially from the other aliphatic esters both as to activity and use and in the limitations with respect to manufacture and the properties thereof. The differences in reactions available from the benzoate have been unexpected but greatly beneficial in the use of benzoate esters as compared to the propionate or the cyclopentyl propionate or other aliphatic esters of 19-Nor-testosterone. These differences in activity and results which have been clearly established by animal data indicate that the benzoate is practically void of androgenic activity while supplying a high degree of myotrophic or protein anabolic activity whereas the aliphatic esters such as the propionate, cyclopentyl propionate or valerate all show a comparatively high ratio of androgenic activity to myotrophic or protein anabolic activity.

As previously pointed out, high androgenic activity is undesirable in this type of steroid, yet it is, in general, difficult to formulate a steroid which offers a desired protein anabolic activity without supplying at least some amount of androgenic activity. While the aliphatic esters of 19-Nor-testosterone follow the general rule and have a high ratio of androgenic activity to myotrophic or protein anabolic activity, the 19-Nor-testosterone benzoate appears to be non-analogous in that a high degree of protein anabolic activity is secured practically in the absence of any androgenic activity.

This has been established by animal tests performed upon rats in which daily administrations were made to castrated male rats for seven consecutive days by subcutaneous injection to introduce a total of 700 μg. of the various esters contained in corn oil as the diluent.

The following table represents results which were secured as indicated by the growth rates of the various glands. Gain in weight of the ventral prostate gland and seminal vesicles proves androgenic activity and gain in weight of the levator ani proves myotrophic or protein anabolic activity.

| No. of Rats | Treatment | Body Weight (gm.) | Ventral Prostate (mg.) | Seminal Vesicles (mg.) | Levator ani (mg.) |
|---|---|---|---|---|---|
| 5 | Oil only | 66 | 11.0 | 8.6 | 15.9 |
| 5 | 19-Nor-testosterone benzoate, 700 μg. | 70 | 16.8 | 12.2 | 39.1 |
| 5 | 19-Nor-testosterone valerate, 700 μg. | 66 | 46.6 | 42.8 | 54.3 |
| 5 | 19-Nor-testosterone propionate resin, 700 μg. | 63 | 52.2 | 50.4 | 51.7 |
| 5 | 19-Nor-testosterone propionate crystals, 700 μg. | 65 | 54.8 | 45.0 | 48.4 |
| 6 | Testosterone propionate, 700 μg. | 66 | 89.8 | 99.9 | 42.4 |

For use as a measure in the trade, the important value constitutes the ratio of protein anabolic activity to androgenic activity which can be determined by the growth of the levator ani to the ventral prostate. This ratio, from the data secured above, is as follows:

19-Nor-testosterone benzoate _____ 4.000
19-Nor-testosterone valerate _____ 1.079
19-Nor-testosterone propionate _____ 0.802
Testosterone propionate _____ 0.336

From these results it will be apparent that the benzoate provides a very desirable amount of activity represented by growth of the levator ani as compared to the relatively negligible growth of the ventral prostate. On the other hand, the growth of the levator ani which is secured by the aliphatic esters is slightly greater in the levator ani with equivalent amounts of injection but the amount of growth in the ventral prostate is even greater which indicates that the aliphatic esters impart a high degree of androgenic activity as compared to the benzoate with a relatively small difference existing in the amount of the protein anabolic activity. This difference is more noticeable in the ratio of the gain in weight of the levator ani as compared to the ventral prostate which indicates that the aliphatic esters impart androgenic activity as high as or greater than the protein anabolic activity, whereas the latter is secured in amounts four times greater than the androgenic activity with the benzoate ester.

It will be understood that changes may be made in the details of formulation and application without departing from the spirit of the invention, especially as defined in the following claims.

I claim:

1. The compound 19-Nor-delta-4-androstene, 3-one, 17-beta benzoate.

2. The method of preparing 19-Nor-delta-4-androstene, 3-one, 17-beta benzoate comprising the step of reacting 19-Nor-delta-4-androstene, 3-one, 17-beta-ol with benzoic anhydride.

No references cited.